United States Patent
Castillo et al.

(10) Patent No.: US 9,404,455 B2
(45) Date of Patent: Aug. 2, 2016

(54) METHOD FOR OPERATING AN INTERNAL COMBUSTION ENGINE WITH ASSISTANCE FROM AN ELECTRIC MACHINE, AND INTERNAL COMBUSTION ENGINE

(75) Inventors: Fernando Guillen Castillo, Regensburg (DE); Martin Jehle, Lappersdorf (DE); Holger Lang, Regensburg (DE); Frank Weiss, Pentling/Grasslfing (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 253 days.

(21) Appl. No.: 13/992,773

(22) PCT Filed: Dec. 7, 2011

(86) PCT No.: PCT/EP2011/071993
§ 371 (c)(1),
(2), (4) Date: Jun. 10, 2013

(87) PCT Pub. No.: WO2012/076561
PCT Pub. Date: Jun. 14, 2012

(65) Prior Publication Data
US 2013/0255639 A1 Oct. 3, 2013

(30) Foreign Application Priority Data

Dec. 10, 2010 (DE) .......................... 10 2010 062 809
Dec. 17, 2010 (DE) .......................... 10 2010 063 377

(51) Int. Cl.
*F02M 61/06* (2006.01)
*F02M 51/06* (2006.01)
(Continued)

(52) U.S. Cl.
CPC .................. *F02M 51/06* (2013.01); *B60K 6/48* (2013.01); *B60W 10/06* (2013.01); *B60W 10/08* (2013.01);
(Continued)

(58) Field of Classification Search
CPC .......... F02M 51/06; F02M 2200/8092; F02M 65/00; F02D 41/2467; F02D 2200/0614; F02D 2200/0616; F02D 2200/1004; F02D 2200/1006
See application file for complete search history.

(56) References Cited

U.S. PATENT DOCUMENTS 5,469,820 A * 11/1995 Data ...................... B60K 6/485
123/192.2
7,440,827 B2 * 10/2008 Kawada ................. B60K 6/365
180/65.245

(Continued)

FOREIGN PATENT DOCUMENTS

DE       19751100 A1     6/1998   ............ B60K 26/00
DE       19945618 A1 *   3/2001   ............ F02D 41/04

(Continued)

OTHER PUBLICATIONS

International Search Report and Written Opinion, Application No. PCT/EP2011/071993, 16 pages, Apr. 16, 2012.

(Continued)

*Primary Examiner* — Stephen K Cronin
*Assistant Examiner* — Kevin R Steckbauer
(74) *Attorney, Agent, or Firm* — Slayden Grubert Beard PLLC

(57) ABSTRACT

A method for operating an internal combustion engine is disclosed, in which method test injections are carried out in order to adapt, during the operation of the internal combustion engine, the injection parameters used for the control of the injection processes. For this purpose, during the test injections, an electric machine which is coupled to the internal combustion engine generates negative torque impulses in a manner synchronized with the positive torque impulses generated by the test injections, which negative torque impulses counteract the torque impulses generated by the test injections. In this way, rotational speed oscillations generated by the test injections are eliminated. Also described is an internal combustion engine of said type.

12 Claims, 2 Drawing Sheets

(51) Int. Cl.
*B60W 10/08* (2006.01)
*F02D 41/12* (2006.01)
*F02D 41/14* (2006.01)
*B60K 6/48* (2007.10)
*B60W 10/06* (2006.01)
*B60W 30/20* (2006.01)
*B60W 20/00* (2016.01)
*F02D 41/24* (2006.01)
*B60W 50/00* (2006.01)

(52) U.S. Cl.
CPC ............... *B60W 20/50* (2013.01); *B60W 30/20* (2013.01); *F02D 41/123* (2013.01); *F02D 41/1497* (2013.01); *B60W 2050/0039* (2013.01); *B60W 2510/0638* (2013.01); *F02D 41/2438* (2013.01); *F02D 41/2467* (2013.01); *F02D 2200/1004* (2013.01); *F02M 2200/8092* (2013.01); *Y02T 10/6221* (2013.01); *Y02T 10/6286* (2013.01)

(56) References Cited

U.S. PATENT DOCUMENTS

| | | | | |
|---|---|---|---|---|
| 7,596,992 B2 * | 10/2009 | Asano | ................ | F02D 41/2467 123/486 |
| 7,765,054 B2 * | 7/2010 | Jung | ................ | F02D 41/0087 123/339.1 |
| 8,036,815 B2 * | 10/2011 | Okumoto | ............ | F02N 11/0844 123/179.28 |
| 8,332,091 B2 * | 12/2012 | Zeh | ........................ | B60K 6/46 123/295 |
| 8,527,182 B2 * | 9/2013 | Minami | .............. | F02D 41/1402 123/434 |
| 8,620,500 B2 * | 12/2013 | Becker | ..................... | B60K 6/48 701/22 |
| 8,739,764 B2 * | 6/2014 | Nakamura | ................ | F02D 9/06 123/479 |
| 2011/0224888 A1 | 9/2011 | Girotto et al. | ................ | 701/103 |
| 2012/0296555 A1 * | 11/2012 | Scavone | .............. | F02D 41/1482 701/104 |
| 2013/0255639 A1 | 10/2013 | Guillen Castillo et al. | ... | 123/472 |

FOREIGN PATENT DOCUMENTS

| | | | | |
|---|---|---|---|---|
| DE | 10305523 A1 | 8/2004 | .............. | F02D 41/22 |
| DE | 102006013295 A1 | 9/2007 | ............ | B60W 10/06 |
| DE | 102006027405 B3 | 12/2007 | .............. | F02D 41/20 |
| DE | 102008047476 A1 | 4/2010 | .............. | F02D 45/00 |
| EP | 0899151 A2 | 3/1999 | .............. | B60K 6/20 |
| FR | 2982910 A1 * | 5/2013 | ............ | B60W 10/06 |
| JP | WO 2009019584 A2 * | 2/2009 | .............. | B60K 6/365 |
| WO | 2009/019584 A2 | 2/2009 | ................ | B60K 6/24 |
| WO | WO 2009019584 A2 * | 2/2009 | .............. | F02D 41/12 |
| WO | 2012/076561 A1 | 6/2012 | ............ | B60W 10/08 |

OTHER PUBLICATIONS

Chinese Office Action, Application No. 201180059120.3, 19 pages, Feb. 28, 2015.

* cited by examiner

METHOD FOR OPERATING AN INTERNAL COMBUSTION ENGINE WITH ASSISTANCE FROM AN ELECTRIC MACHINE, AND INTERNAL COMBUSTION ENGINE

CROSS-REFERENCE TO RELATED APPLICATIONS

This application is a U.S. National Stage Application of International Application No. PCT/EP2011/071993 filed Dec. 7, 2011, which designates the United States of America, and claims priority to DE Application No. 10 2010 062 809.3 filed Dec. 10, 2010 and DE Application No. 10 2010 063 377.1 filed Dec. 17, 2010, the contents of which are hereby incorporated by reference in their entirety.

TECHNICAL FIELD

The present disclosure relates to a method for operating an internal combustion engine, which is provided with at least one injector, with assistance from an electric machine, in which method test injections are performed in order to adapt, during the operation of the internal combustion engine, the injector parameters used for controlling the injection processes. The disclosure is also directed to an internal combustion engine having at least one injector, having a control unit and having an electric machine which assists the internal combustion engine. Some embodiments may relate specifically to diesel engines or lean-burn gasoline engines.

BACKGROUND

The injectors of internal combustion engines have tolerances which can lead to unexpected inaccuracies with regard to the injected fuel amount and which can thus result in an impairment in the quality of the emissions of the internal combustion engine. This can be prevented by means of an adaptation of the injector characteristic over the operating duration of the internal combustion engine. It is known for the characteristics of injectors in gasoline and diesel engines to be adapted over the operating duration of the engines in order to compensate for production tolerances and changes occurring during operation. The adapted injector characteristics are then used for the further control of the injectors, such that exact fuel amounts can be injected.

It is thus possible, by means of an exact adaptation of the overall injector characteristic, for even injectors with a high tolerance drift over their service life to be used to adhere to even more stringent future emissions requirements.

To perform such an adaptation of the injector characteristics, it has hitherto been the case that, during fuel shut-off phases, test injections were carried out in which periodic injection pulses for one of the injectors were carried out in order to inject a small amount of fuel, for example every second time a top dead center of the corresponding cylinder was reached (in-house prior art). During said test injections, the rotational speed behavior of the internal combustion engine was observed by means of the crankshaft position sensor. From the rotational speed behavior, the generated engine torque was estimated and the corresponding fuel amount to be injected was calculated. By carrying out said process repeatedly for each cylinder, it was possible for the injector parameters for each cylinder to be adapted during the operation of the internal combustion engine.

With said adaptation method, however, rotational speed oscillations of the internal combustion engine can arise, which have a disturbing effect. The method therefore has only a limited scope for use, and in particular can be used only in conjunction with small fuel amounts and only in conjunction with certain drive situations. Furthermore, considerable calibration outlay is required for the estimation of the generated torque from the determined rotational speed.

A method having the features of the preamble of patent claim 1 is known from DE 103 05 523 A1.

It is known from EP 0 899 151 A2 to re-establish the functionality of a NOx adsorption device by means of enrichment, and to compensate the resulting torque pulses by means of the regenerative braking force of an electric motor.

It is known from DE 10 2006 013 295 A1 for changes in torque of an internal combustion engine owing to switching between operating modes to be compensated by means of an electric motor.

It is described in DE 197 51 100 A1 that torque fluctuations of an internal combustion engine are suppressed by changing the current of an electric motor on the basis of a value determined by a torque/motor current characteristic curve decision device.

With the known adaptation methods, it is however only possible to adapt the injector characteristic in the case of very small injection amounts.

SUMMARY

One embodiment provides a method for operating an internal combustion engine, which is provided with at least one injector, with assistance from an electric machine, in which method test injections are performed in order to adapt, during the operation of the internal combustion engine, the injector parameters used for controlling the injection processes, wherein, during the test injections, an electric machine coupled to the internal combustion engine generates negative torque pulses in a synchronized manner with positive torque pulses generated by the test injections, said negative torque pulses counteracting the torque pulses generated by the test injections.

In a further embodiment, the amplitude and/or duration of the torque pulses generated by the electric machine are adapted over time.

In a further embodiment, the amplitude and/or duration of the torque pulses generated by the electric machine and adapted are used as a measure for the torque pulses generated by the test injections and are used for calculating the fuel amount to be injected and/or for adapting the injector parameters.

In a further embodiment, the method is carried out during fuel shut-off phases.

In a further embodiment, the method is carried out during normal ignition phases of the internal combustion engine.

In a further embodiment, the torque pulses generated by the test injections and the torque pulses generated by the electric machine are gradually increased.

In a further embodiment, the torque pulses generated by the test injections are supplied, as a value predefined by the engine controller, to the controller of the electric machine.

In a further embodiment, the torque pulses generated by the test injections are determined, supplied to the engine controller, and then supplied to the controller of the electric machine.

In a further embodiment, to compensate the torque pulses generated by the test injections, the electric machine is activated a defined time before the compensation time in order to prevent delays in the implementation.

In a further embodiment, the method includes the following steps: calculating a setpoint rotational speed of the internal combustion engine for the present operating state; generating a test pulse at the injector; estimating the torque pulse generated by said test pulse; measuring the deviation between the calculated setpoint rotational speed and the actual rotational speed of the internal combustion engine as a result of the electric machine; generating a torque pulse by means of the electric machine for compensation of the measured deviation; comparing the torque pulse information generated by the electric machine with the estimated torque pulse information, and determining the difference; and adapting the injector characteristic using the determined difference.

In a further embodiment, the torque pulse generated by the electric machine is used for compensation of torque deviations of the internal combustion engine.

In a further embodiment, the information regarding the additional torque required from the electric machine is used for adapting the torque model of the internal combustion engine.

In a further embodiment, the adaptation of the injection amount of the injector is performed after the end of the adaptation of the torque model.

In a further embodiment, the method for operating an internal combustion engine having a plurality of injectors is carried out for all injectors over the entire injection range.

Another embodiment provides an internal combustion engine having at least one injector, having a control unit and having an electric machine, wherein the control unit and the electric machine are designed for carrying out any of the methods disclosed above.

Another embodiment provides an internal combustion engine having at least one injector, having a control unit and having an electric machine which assists the internal combustion engine, wherein the control unit and the electric machine are designed for carrying out any of the methods disclosed above.

BRIEF DESCRIPTION OF THE DRAWINGS

Exemplary embodiments will be explained in more detail below on the basis of the schematic drawings, wherein.

DETAILED DESCRIPTION

Figure 1:
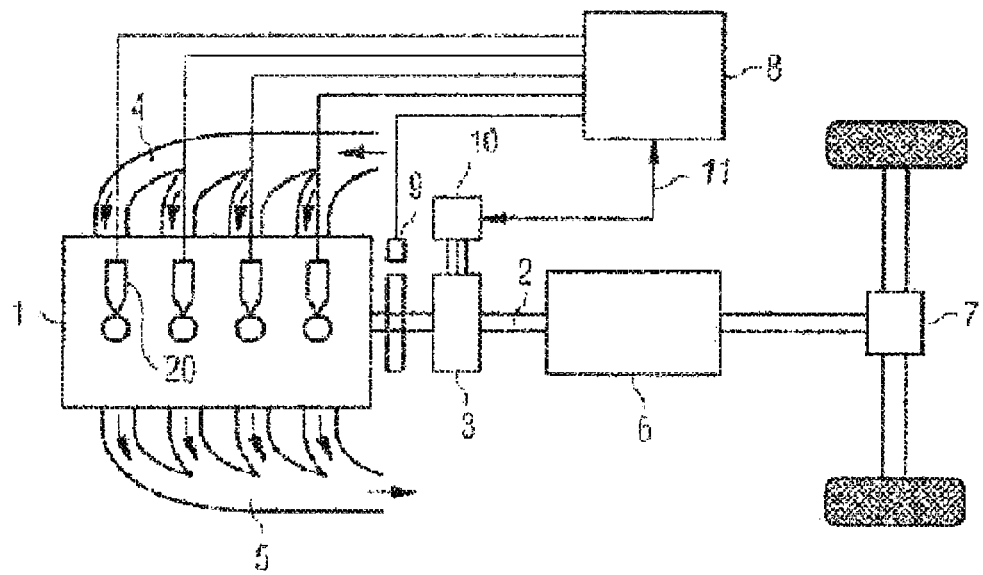
FIG. 1 is a schematic illustration of an internal combustion engine which has an electric machine.

Certain embodiments provide a method of the type described in the introduction by means of which particularly good running characteristics of the internal combustion engine can be attained and which permits an adaptation of the injector characteristic in a particularly precise manner.

According to some embodiments, therefore, torque oscillations caused by the test injections performed are smoothed or compensated by virtue of torque pulses being generated by an electric machine which is coupled to the internal combustion engine, said torque pulses counteracting, and thus neutralizing, the torque pulses generated by the test injections. Such an electric machine may be for example an electric motor arranged parallel to the internal combustion engine in a hybrid vehicle, though may also, in the case of a conventional internal combustion engine, be a conventional alternator or a starter-generator. Said electric machines can therefore impart an additional torque to a drive output shaft of the internal combustion engine or pick off torque from a drive output shaft of said type. The corresponding picking-off of torque or the corresponding imparting of torque by the electric machine is referred to here as "torque generated by the electric machine", said torque being controlled such that the electric machine generates negative torque pulses in a synchronized manner with the positive torque pulses generated by the test injections, said negative torque pulses effecting the desired compensation.

Some embodiments provide an adaptation method, assisted by an electric machine, for the characteristic of an injector.

The torque pulses generated by the test injections can be supplied, as a value predefined by the engine controller, to the controller of the electric machine. It is however also possible for the torque pulses generated by the test injections to first be determined and supplied to the engine controller and then supplied to the controller of the electric machine. The electric machine may for example have dedicated control devices which then, as a function of the supplied values corresponding to the torque pulses of the test injections, correspondingly control the torque pulses (amplitude and/or pulse duration) generated by the electric machine.

It is preferably possible for the amplitude and/or duration of the torque pulses generated by the electric machine to be adapted over time. It is then possible in particular for the amplitude and/or duration of the torque pulses generated by the electric machine and adapted to be used in particular as a measure for the torque pulses generated by the test injections and to be used for calculating the fuel amount to be injected and/or for adapting the injection parameters. In this way, the fuel amount to be injected can be determined in a precise and simple manner, or a simple and precise adaptation of the injector parameters can be performed.

Furthermore, the shape of the torque pulses generated by the electric machine may also be adapted over time.

The disclosed method may be carried out during fuel shut-off phases. Said method however also has the advantage that it can be carried out during normal ignition phases of the internal combustion engine, as the test injections can be carried out with larger fuel amounts because, rotational speed oscillations caused by this are prevented. The adaptation of the injector parameters can therefore be performed during normal ignition phases of the internal combustion engine by virtue of the injected fuel amount of a cylinder being increased, and the additional torque being compensated by means of a negative torque pulse from the electric machine.

In yet another variant of the method, the torque pulses generated by the test injections and the torque pulses generated by the electric machine are gradually increased.

The torque generation of an electric machine, including that of a controlled or regulated alternator, may be utilized for compensation of the negative effect of rotational speed oscillations or rotational speed fluctuations resulting from the test injections being carried out, and here, said torque generation by the electric machine is utilized in particular for the determination of the fuel amount to be injected. Overall, therefore, it is possible with the disclosed method to attain improved running smoothness of the internal combustion engine, as oscillations or fluctuations of the internal combustion engine rotational speed are suppressed. The adaptation of the corresponding injector parameters can be performed by means of test injections with larger fuel amounts, without the running characteristics of the internal combustion engine being adversely affected as a result. The adaptation of said parameters may in particular also take place during normal ignition phases of the internal combustion engine. The torque generated by the test injections can be determined or estimated in a simple manner, because the rotational speed behavior of the internal combustion engine is no longer required for this purpose. Overall, it is possible to attain a particularly precise adaptation of the injector parameters.

It is preferable if, to compensate the torque pulses generated by the test injections, the electric machine is activated a defined time before the compensation time in order to prevent delays in the implementation. In this way, communication delays between the control unit (ECU) of the internal combustion engine and the corresponding control devices of the electric machine are avoided. In particular, the torque setpoint value of the electric machine may be increased a certain time before the torque generation that takes place as a result of the test injections.

It is also possible for the behavior of the torque pulses over time to be regulated, for example by means of an offset, in order to attain an optimized synchronization.

Other embodiments provide an internal combustion engine having at least one injector, having a control unit and having an electric machine. The control unit and the electric machine may be designed for carrying out the above-described method.

In one embodiment, the method for operating an internal combustion engine, which is provided with at least one injector, with assistance from an electric machine has the following steps:
    calculating a setpoint rotational speed of the internal combustion engine for the present operating state;
    generating a test pulse at the injector;
    estimating the torque pulse generated by said test pulse;
    measuring the deviation between the calculated setpoint rotational speed and the actual rotational speed of the internal combustion engine as a result of the electric machine;
    generating a torque pulse by means of the electric machine for compensation of the measured deviation;
    comparing the torque pulse information generated by the electric machine with the estimated torque pulse information, and determining the difference; and
    adapting the injector characteristic using the determined difference.

In the above-mentioned embodiment of the method, a test pulse is generated at the injector.

Said test pulse leads to a deviation of the rotational speed of the internal combustion engine from the calculated setpoint rotational speed. Since the electric machine is capable of measuring said deviation between the actual rotational speed and setpoint rotational speed, and can in particular react very rapidly to said deviation because for example 40 measurements are performed per revolution, the electric machine can, in reaction to said deviation, generate a torque pulse which leads to a compensation of said rotational speed deviation of the internal combustion engine caused by the test pulse of the injector. The precise value of said torque pulse can be calculated by the electric machine with very high accuracy (tolerance well below 1%). Compensation of the rotational speed deviation is thus realized in this way.

Furthermore, in the above-mentioned embodiment of the method, the torque pulse generated by the electric machine for compensation purposes is compared with an estimated value, determined by the control unit of the internal combustion engine, of the torque pulse generated by the test pulse, and the difference between the two values is determined. Said difference between the two values corresponds exactly to the inaccuracy of the injector characteristic. Using the determined difference, corresponding adaptation of the injector characteristic is then performed.

In the above-stated embodiment of the method, the electric machine is used in the mode of a closed regulating loop. The control unit of the internal combustion engine calculates a setpoint rotational speed of the internal combustion engine for the present operating state, wherein said setpoint rotational speed is demanded of the internal combustion engine but also, in parallel therewith, of the electric machine.

In the above-stated embodiment of the method, therefore, an adaptation of the injector characteristic and thus an adaptation of the injected fuel amount are performed in the manner described above. If the internal combustion engine has a plurality of injectors, the disclosed method may be carried out for all injectors over the entire injection range. In this way, the tolerances of the injectors can be reduced to the measurement tolerances.

An advantage of the above-stated embodiment of the method includes that the complete characteristic of all of the injectors can be adapted in a highly robust manner with high accuracy. Rotational speed oscillations of the internal combustion engine are compensated in an efficient manner by the electric machine.

In one refinement of the above-stated embodiment, the torque pulse generated by the electric machine is used for compensation of torque deviations of the internal combustion engine. In this way, a torque adaptation of the internal combustion engine is performed. If the torque model of the internal combustion engine is exact, the electric machine exhibits passive behavior. In the event of inaccuracies of the torque model of the internal combustion engine, the electric machine delivers a corresponding torque pulse in order to compensate the difference. The corresponding information regarding the additional torque required can be used to adapt the torque model of the internal combustion engine. The disclosed method, in particular the adaptation of the injection amount of the injector, may be carried out after the end of the adaptation of the torque model.

Other embodiments provide an internal combustion engine having at least one injector, having a control unit and having an electric machine which assists the internal combustion engine. The control unit and the electric machine may be designed for carrying out the above-described method steps of the above-stated special embodiment of the disclosed method.

FIG. 1 is a schematic partial illustration of a vehicle provided with an internal combustion engine 1. The internal combustion engine has an air intake tract 4 and an exhaust tract 5. Said internal combustion engine is provided with an injection system, of which four injectors 20 are schematically illustrated.

The torque generated by the internal combustion engine 1 is output via a drive output shaft 2 and a transmission 6 to a drivetrain 7 by means of which the rear wheels of the vehicle are driven. To the drive output shaft 2 there is coupled an electric machine 3, for example a starter-generator, which is connected to an inverter 10.

The internal combustion engine 1 also has a control unit 8 (ECU) by means of which the injectors 20 are activated so as to discharge a desired fuel amount. Furthermore, the control unit 8 is connected to the electric machine 3 via a bus 11 which leads to the inverter 10. The rotational speed of the drive output shaft 2 of the internal combustion engine 1 is measured, and supplied as a signal to the control unit 8, by means of a rotational speed sensor 9.

As mentioned above, corresponding test injections are performed in order to adapt the injector characteristic. The resulting torque oscillations are detected by means of the rotational speed sensor 9 and supplied as information to the control unit 8. The latter calculates or estimates from the rotational speed behavior the generated engine torque and supplies said value to the controller of the electric machine in order that the latter generates a corresponding torque pulse which counteracts and compensates the torque pulse generated by the test injections. Furthermore, the torque pulse generated by the electric machine is used for adaptation of the injector characteristic.

Figure 2:
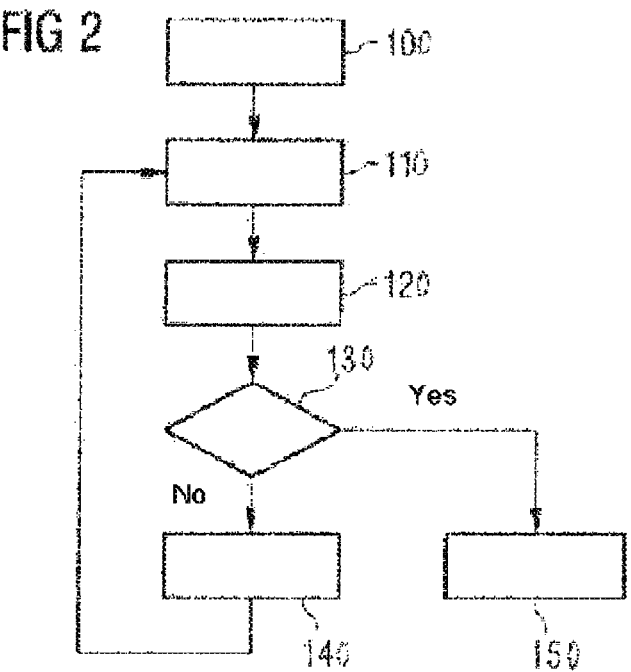
FIG. 2 is a flow diagram for the execution of an example embodiment of the method.

FIG. 2 shows a flow diagram of an exemplary embodiment of the method. In step 100, the initial values for the test pulses are determined. In step 110, the test pulses are performed. An evaluation of the rotational speed signal then takes place in step 120. In step 130, it is checked whether the adaptation of the injector characteristic should be ended. If this is the case, the corresponding adaptation values are used (as per step 150). If this is not the case, the method proceeds to step 140, in which an adaptation of the present compensation takes place. The method then returns to step 110 again.

Figure 3:
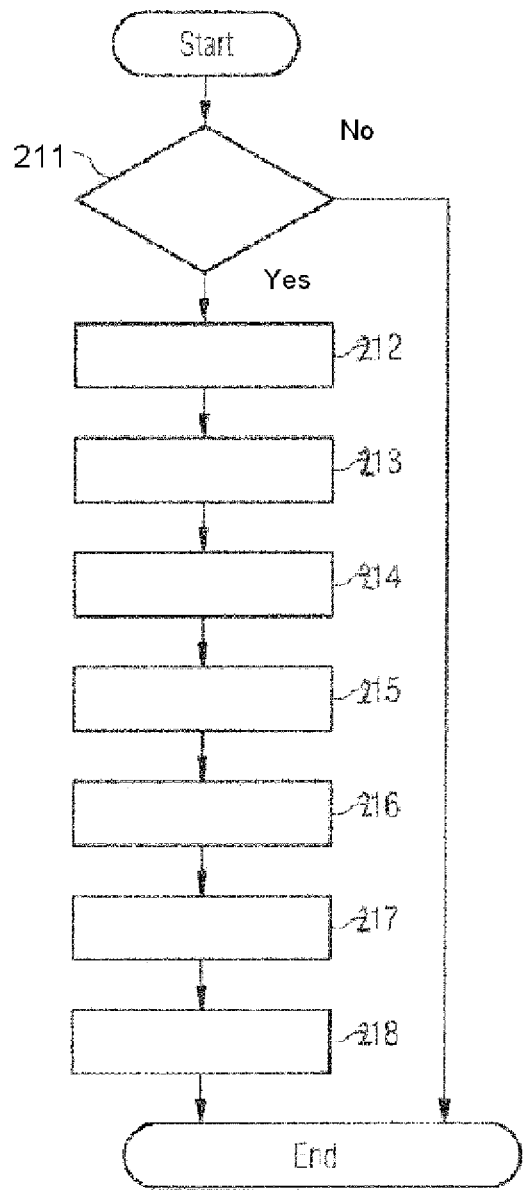
FIG. 3 is a flow diagram of the method steps of an example embodiment of the method.

FIG. 3 illustrates the process of a special embodiment of the method in individual steps. The individual steps of said method are illustrated in a flow diagram. After the start, it is detected at 211 whether there is a demand for adaptation of the present load point. If this is not the case, the method proceeds to the end. If there is a demand for adaptation, a torque adaptation of the internal combustion engine takes place in step 212 in the manner described above. Thereafter, in step 213, the setpoint rotational speed of the internal combustion engine is calculated. In step 214, the setpoint rotational speed of the internal combustion engine is demanded of the internal combustion engine and of the electric machine. In step 215, the internal combustion engine generates an injection pulse. In step 216, the electric machine compensates the rotational speed oscillation of the internal combustion engine, measures the required torque value and transmits the latter to the control unit (ECU). In step 217, the control unit (ECU) of the internal combustion engine compares the measured torque value from the electric machine with the input estimated value of the test pulse torque and determines the corresponding difference. In step 218, the adaptation of the injector characteristic is then performed using the difference resulting from the comparison in step 217. The method described above may be repeated individually for each injector of the internal combustion engine.

What is claimed is:

1. A method for operating an internal combustion engine having at least one injector and an electric machine coupled to the internal combustion engine, the method comprising performing the following method steps during an ignition phase other than a fuel shut-off phase of the internal combustion engine:
   during the operation of the internal combustion engine, performing injections to adapt injector parameters used for controlling injection processes of the at least one injector, wherein the test injections generate positive torque pulses,
   during the test injections, the electric machine generates negative torque pulses in a synchronized manner with the positive torque pulses generated by the test injections, wherein said negative torque pulses generated by the electric machine counteract the positive torque pulses generated by the test injections;
   adapting an amplitude or a duration of the negative torque pulses generated by the electric machine over time; and
   using the adapted amplitude or duration of the negative torque pulses (a) as a measure for the torque pulses generated by the test injections and (b) for calculating a fuel amount to be injected or for adapting the injector parameters.

2. The method of claim 1, comprising gradually increasing the positive torque pulses generated by the test injections and the negative torque pulses generated by the electric machine.

3. The method of claim 1, comprising supplying the positive torque pulses generated by the test injections, as a value predefined by an engine controller, to a controller of the electric machine.

4. The method of claim 1, comprising supplying a signal representing the positive torque pulses generated by the test injections to an engine controller, and then to a controller of the electric machine.

5. The method of claim 1, comprising, to compensate the positive torque pulses generated by the test injections, activating the electric machine a defined time before a compensation time to prevent delays.

6. The method of claim 1, comprising:
   calculating a setpoint rotational speed of the internal combustion engine for a present operating state;
   generating a test pulse at an injector;
   estimating the torque pulse generated by said test pulse;
   measuring a deviation between the calculated setpoint rotational speed and an actual rotational speed of the internal combustion engine;
   the electric machine generating a torque pulse to compensate for the measured deviation;
   determining a difference between the torque pulse generated by the electric machine and the estimated torque pulse; and
   adapting an injector characteristic based on the determined difference.

7. The method of claim 6, comprising using the torque pulse generated by the electric machine for compensation of torque deviations of the internal combustion engine.

8. The method of claim 7, comprising using information regarding additional torque required from the electric machine for adapting a torque model of the internal combustion engine.

9. The method of claim 8, wherein an adaptation of the injection amount of the injector is performed after an end of the adaptation of the torque model.

10. The method of claim 6, comprising performing the method for all injectors of the internal combustion engine during all injection phases of the internal combustion engine.

11. An internal combustion engine, comprising: at least one injector,
    a control unit, and
    an electric machine,
    wherein the control unit and the electric machine are configured to perform the following functions during an ignition phase other than a fuel shut-off phase of the internal combustion engine:
       during the operation of the internal combustion engine, perform test injections to adapt injector parameters used for controlling injection processes of the at least one injector, wherein the test injections generate positive torque pulses, and
       during the test injections, the electric machine generates negative torque pulses in a synchronized manner with the positive torque pulses generated by the test injections, wherein said negative torque pulses generated by the electric machine counteract the positive torque pulses generated by the test injections.

12. An internal combustion engine, comprising:
    at least one injector,
    a control unit, and
    an electric machine configured to assist the internal combustion engine,
    wherein the control unit and the electric machine are configured to perform the following functions during an ignition phase other than a fuel shut-off phase of the internal combustion engine:
calculate a setpoint rotational speed of the internal combustion engine for a present operating state;
generate a test pulse at an injector;
estimate a torque pulse generated by said test pulse;
measure a deviation between the calculated setpoint rotational speed and an actual rotational speed of the internal combustion engine;
use the electric machine to generate a torque pulse to compensate for the measured deviation;
determine a difference between the torque pulse generated by the electric machine and the estimated torque pulse; and
adapt an injector characteristic based on the determined difference.

* * * * *